United States Patent [19]
Schulze et al.

[11] Patent Number: 5,498,665
[45] Date of Patent: Mar. 12, 1996

[54] USE OF POLYPROPYLENE GLYCOL AS A SHRINKAGE-REDUCING ADDITIVE IN DISPERSION POWDER COMPOSITIONS FOR CONSTRUCTION MATERIALS

[75] Inventors: Joachim Schulze, Burghausen; Rainer Figge, Ampfing, both of Germany

[73] Assignee: Wacker-Chemie GmbH, Munich, Germany

[21] Appl. No.: 344,401

[22] Filed: Nov. 23, 1994

Related U.S. Application Data

[63] Continuation of Ser. No. 74,027, Jun. 4, 1993, abandoned.

[30] Foreign Application Priority Data

Jun. 4, 1992 [DE] Germany ............... 42 18 493.2

[51] Int. Cl.⁶ ............... C08L 61/10; C08L 33/04; C08L 29/04; C08L 25/06
[52] U.S. Cl. ............... 525/57; 525/227; 525/134; 525/150; 106/713; 106/654; 524/425
[58] Field of Search ............... 525/57, 134, 227, 525/150; 106/713, 654; 524/425

[56] References Cited

U.S. PATENT DOCUMENTS

| | | | |
|---|---|---|---|
| 3,615,785 | 2/1968 | Moorer et al. | 106/90 |
| 3,663,251 | 5/1972 | Moren et al. | 106/90 |
| 3,784,648 | 1/1974 | Bergmeister et al. | 260/856 |
| 4,204,877 | 5/1980 | Moorer et al. | 106/90 |
| 4,587,279 | 5/1986 | Salyer et al. | 523/206 |
| 4,704,416 | 11/1987 | Eck et al. | 524/17 |
| 4,962,173 | 10/1990 | Kinoshita et al. | 526/240 |
| 5,118,751 | 6/1992 | Schulze et al. | 524/503 |

FOREIGN PATENT DOCUMENTS

| | | |
|---|---|---|
| 1221113 | 4/1987 | Canada . |
| 2020449 | 1/1991 | Canada . |
| 0116524 | 8/1984 | European Pat. Off. . |
| 0308950 | 3/1989 | European Pat. Off. . |
| 0407889 | 1/1991 | European Pat. Off. . |
| 0477900 | 4/1992 | European Pat. Off. . |
| 2110988 | 6/1972 | France . |
| 2614261 | 10/1977 | France . |
| 1569637 | 6/1980 | United Kingdom . |

OTHER PUBLICATIONS

Derwent Abstract of DE–A 3732114, "Portland cement shrinkage inhibitor–comprises alkane diol, pref. dimethyl–propane–diol".
Chemical Abstract 79:96272, "Prevention of shrinkage of cement during hardening".
Chemical Aabstract 101:176465, "Shrinkage–reducing agents for cements".
TIZ Tonindustrie–Zeitung, Bd, 109, Nr. 9, 1985, Coburg, D. p. 698–703, Dr. J. Schulze (No Translation).

*Primary Examiner*—W. Robinson H. Clark
*Attorney, Agent, or Firm*—Burgess, Ryan & Wayne

[57] ABSTRACT

The invention relates to the use of polypropylene glycol as a shrinkage-reducing additive in dispersion powder compositions for construction materials containing a) a base polymer from the group consisting of vinyl ester polymers, (meth)acrylate and/or styrene (co)polymers and vinyl chloride polymers, and b) either
  b1) 2 to 20% by weight, based on the base polymer, of polyvinyl alcohol having a degree of hydrolysis of 85 to 94 mol % and a Höppler viscosity of 2 to 40 mPa.s or
  b2) 2 to 20% by weight, based on the base polymer, of alkali metal salts or alkaline earth metal salts of phenolsulfonic acid-formaldehyde condensation products, and c) 3 to 30% by weight, based on the total weight of polymeric components, of fine antiblocking agents, wherein d) the content of polypropylene glycol is 1 to 20% by weight, based on the base polymer.

11 Claims, No Drawings

USE OF POLYPROPYLENE GLYCOL AS A SHRINKAGE-REDUCING ADDITIVE IN DISPERSION POWDER COMPOSITIONS FOR CONSTRUCTION MATERIALS

This application is a continuation of application Ser. No. 08/074,027, filed Jun. 4, 1993, now abandoned.

BACKGROUND OF THE INVENTION

1. Field of the Invention

The invention relates to the use of polypropylene glycol as a shrinkage-reducing additive in dispersion powder compositions for construction materials, in particular dry mortars, which contain Portland cement as an inorganic binder.

2. Background Art

Dispersion powders are not new per se and have been used for many years particularly in the construction industry as a synthetic resin modifier of hydraulically setting systems. An overview of the effect of dispersion powders in construction materials is given in the journal Tonindustrie TIZ 9, 1985, p. 698. Significant improvements in the properties of adhesion, abrasion resistance, scratch resistance and tensile strength in bending are obtained by the addition.

Dispersion powders are prepared by spray-drying aqueous polymer dispersions with the addition of polyvinyl alcohol and other additives. The readily pourable powder with particle sizes between 10 and 250 µm is redispersed in water to form the original dispersion again, with particle sizes between 0.1 and 5 µm. The redispersions should be stable even over a relatively long period, that is to say they should not tend to sediment.

Such dispersion powders are described, for example, in EP-A 228 657, DE-OS 26 14 261 or DE-PS 20 49 114.

EP-A 407,889 describes dispersion powders based on water-soluble salts of phenolsulfonic acid-formaldehyde condensation products as an atomization colloid.

The great advantage of dispersion powders compared with the liquid dispersions which can also alternatively be used is that dry mortar mixtures can be produced which only have to be mixed with water on the site. This has many advantages such as increased work safety, reliable handling or simple disposal of drums.

One of the negative properties of cement, in particular the Portland cement mostly used, is the shrinkage or contraction of the hydraulic materials, which leads to volume changes of the setting mortars or concretes. If these volume changes become too large, this can lead to cracking in the construction materials. Efforts are therefore made to keep the shrinkage tendency as low as possible.

Standard dispersion powders, consisting of the components of dispersion, atomization colloid, polyvinyl alcohol or phenolsulfonic acid-formaldehyde condensation products, relatively small quantities of additives and antiblocking agents, such as in EP-A 228 657 or EP-A 407 889, lead in construction materials which contain Portland cement as inorganic binder to an increased shrinkage of the material.

Although the shrinkage can be reduced via the formulation by using shrinkage preventing agents, since dry mortars are to be produced pulverulent materials are in general required. A spraying process, which is possible in principle, is laborious and expensive. DE-A 37 32 114 describes pulverulent materials based on alkane diols with terminal OH groups. These materials have the disadvantage that they are hygroscopic and usually not odor-neutral.

JP-A-73 43 014 (C.A. 79: 96272v) proposes adding secondary or tertiary alcohols, specifically glycerine, to cement-containing materials to prevent the shrinkage. The disadvantage in using these compounds as cement additives, however, is the very severe delaying of the setting of the hydraulic materials because of the hygroscopic behavior of these compounds; in addition these products are liquid.

JP-A-59 128 240 (C.A. 101: 176465y) describes polyoxyethylene ethers with a terminal OH group as shrinkage-reducing additives in mixtures with fluorine-containing emulsifiers. The disadvantage is that these are liquid additives to be added separately to the dry mortar mixture.

EP-A2 116 524 claims the use of gypsum for reducing the shrinkage. The disadvantage of this procedure is that, when using gypsum in combination with Portland cement, there is always the danger of expansion due to the gypsum, with the entire strength of the construction material being lost (Czernin, Zementchemie für Bauingenieure, Bauverlag).

Polyalkylene glycols have hitherto been added in small quantities (German Offenlegungsschrift 40 30 638: 0.1 to 2% by weight) to dispersion powder compositions as foaming inhibitors.

SUMMARY OF THE INVENTION

The object was therefore to produce a dispersion powder which does not have the disadvantage of standard dispersion powders, of negatively affecting the shrinkage behavior of construction materials, in particular of dry mortars, which contain Portland cement as inorganic binder, without losing the advantages provided by the addition of dispersion powder to construction materials.

Surprisingly this object can be achieved by using polypropylene glycol as a component of the dispersion powder composition.

The invention relates to the use of polypropylene glycol as a shrinkage-reducing additive in dispersion powder compositions for construction materials containing a) a base polymer from the group consisting of vinyl ester polymers, (meth)acrylate and/or styrene (co)polymers and vinyl chloride polymers, and b) either b1) 2 to 20% by weight, based on the base polymer, of polyvinyl alcohol having a degree of hydrolysis of 85 to 94 mol % and a Höppler viscosity of 2 to 40 mPa.s or b2) 2 to 20% by weight, based on the base polymer, of alkali metal salts or alkaline earth metal salts of phenolsulfonic acid-formaldehyde condensation products, and c) 3 to 30% by weight, based on the total weight of polymeric components, of fine antiblocking agents, wherein d) the content of polypropylene glycol is 1 to 20% by weight, based on the polymer base.

DESCRIPTION OF THE PREFERRED EMBODIMENT

Vinyl ester polymers suitable as base polymer are vinyl acetate homopolymers or copolymers of vinyl acetate and ethylene and/or vinyl chloride and/or other vinyl esters, such as vinyl laurate, vinyl Versatates, vinyl pivalate and/or esters of maleic acid/fumaric acid. Also suitable are homopolymers of vinyl esters of saturated $C_3$–$C_8$ alkyl-carboxylic acids or copolymers thereof with ethylene, vinyl chloride and/or other vinyl esters. The (meth)-acrylate and/or styrene (co)polymers are derived from polymers of styrene and/or esters of acrylic acid and/or methacrylic acid with straight-chain, branched or cyclic aliphatic alcohols with 1 to 20 C atoms. Vinyl chloride-ethylene copolymers are suitable as vinyl chloride polymers.

Substances preferably used are vinyl acetate homopolymers and vinyl acetate-ethylene copolymers with an ethylene content of 1 to 40% by weight, which contain, if appropriate, also 0 to 40% by weight of other vinyl esters and/or vinyl chloride. Also preferred are styrene-acrylates such as styrene-butyl acrylate or styrene-ethylhexyl acrylate with a styrene content of 1 to 70% by weight. Other preferred base polymers are vinyl chloride-ethylene copolymers, which also contain, if appropriate, vinyl esters of saturated $C_3$–$C_8$ alkyl carboxylic acids.

The component b) of the dispersion powder composition consists either of component b1) or component b2). Component b1) consists of water-soluble polymers, preferably 5 to 20% by weight of polyvinyl alcohol with a degree of hydrolysis of 85 to 94 mol % and a Höppler viscosity, determined in a 4% strength solution, of 3 to 25 mPa.s. Component b2) is preferably an alkali metal salt or, in particular, an alkaline earth metal salt of phenol-sulfonic acid-formaldehyde condensation products with one formaldehyde radical per phenol radical and one sulfonic acid group per molecule. In particular component b1) is used in the dispersion powder composition.

The proportion of antiblocking agent c) is preferably 4 to 20% by weight. Antiblocking agents with an average particle size of 0.1 to 50 μm are especially preferred. Examples of antiblocking agents are finely ground aluminum silicates, kieselguhr, pyrogenic silica, precipitated silica, colloidal silica gel, micro-silica, light spar, kaolin, talc, cements, diatomaceous earth, calcium carbonate or magnesium hydrosilicates.

Polypropylene glycol d), which is preferably used in quantities of 1 to 10% by weight, especially preferably 2 to 8% by weight, based on the base polymer, has a molecular weight of 300 to 30,000, preferably 500 to 5000. These products are commercially available and are marketed, for example, by Hoechst AG under the trade name Polyglycols B01. Mixtures of different polypropylene glycols can also be used.

The dispersion powder composition can, if appropriate, also contain further additives.

For example, 0 to 30% by weight, based on the polymer resin, of dispersion, cement thinner, preferably sulfonate group-containing condensation products of melamine or ketone and formaldehyde and/or naphthalenesulfonic acid-formaldehyde and/or phenol-sulfonate-formaldehyde condensation products may also be contained.

If appropriate, 0 to 10% by weight, based on the polymer resin, of completely saponified copolymers of 1-alkylvinyl esters and vinyl esters with a Höppler viscosity of 1 to 25 mPa.s, determined in 4% strength solution, may also be contained. The completely saponified copolymer of alkylvinyl ester and vinyl acetate comprises preferably 5 to 25 mol % of alkylvinyl ester, the alkyl-vinyl ester being especially preferably isopropenyl acetate.

If appropriate, 0 to 1% by weight, preferably 0 to 0.6% by weight, based on the polymer resin, of surface-active substance(s), such as emulsifiers or wetting agents, may be contained. Examples of these are anionic surfactants and non-ionic surfactants, for example alkyl polyglycols or ethylene oxide-propylene oxide copolymers.

If appropriate, 0 to 2% by weight, based on the polymer resin, of foaming inhibitors can also be contained. Suitable foaming inhibitors are commercially available products that have proven themselves for use in hydraulically setting systems. Examples are silicon foaming inhibitors or foaming inhibitors based on liquid hydrocarbons.

In order to produce the dispersion powder composition, the base polymer is used as an aqueous dispersion. To this dispersion is added the polyvinyl alcohol component b1) or phenolsulfonic acid-formaldehyde condensation product b2), preferably b1). Preferably an aqueous solution is used, it being possible to control the viscosity of the dispersion via the amount of water used. Polypropylene glycol d) is present in liquid form and is mixed as such into the dispersion. These mixing operations can take place in any desired sequence, it is only important that a homogeneous dispersion mixture is present. The cement thinners, completely saponified 1-alkylvinyl ester/vinyl ester copolymers, surface-active substances and foaming inhibitors, to be used if appropriate, are preferably added to the mixture, which is in the form of a dispersion, before drying.

After mixing the components, the dispersion is dried, preferably spray- or freeze-dried, especially preferably spray-dried. Recourse can be made here to known devices, such as, for example, spraying through multi-component nozzles or using the disk in an, if appropriately heated, stream of dry gas. In general, temperatures above 250° C. are not used. The optimum temperature of the dry gas can be determined in a few experiments; often temperatures above 60° C. have proven especially suitable.

In order to increase the storability and in order, for example in the case of powders with a low glass transition temperature, to prevent caking and blocking, the powder obtained is treated with the antiblocking agent (anticaking agent) c). This preferably takes place while the powder is still finely distributed, for example is still suspended in the dry gas. In particular the anticaking agent is metered separately, but simultaneously with the dispersion, into the drying device.

The redispersible dispersion powder composition according to the invention is suitable in particular for use in construction materials containing Portland cement as inorganic binder, in particular dry mortars, and therefore, in comparison to a dispersion powder containing no polypropylene glycol, leads to a lower shrinkage of the mortar. The dispersion powder composition according to the invention can also be used successfully in gypsumconstruction materials, lime mortars, adhesives or paints.

The following examples illustrate the, by no means predictable, technical advantage of the dispersion powder composition according to the invention.

EXAMPLES

Substances used:
Dispersion LL 1:
Polyvinyl alcohol-stabilized aqueous dispersion with a solids content of 50% based on a vinyl acetate-ethylene copolymer with a vinyl acetate content of 78% by weight and an ethylene content of 22% by weight, from Wacker-Chemie GmbH.
Dispersion LL 2:
Polyvinyl alcohol-stabilized aqueous dispersion with a solids content of 50% based on an ethylene-vinyl chloride-vinyl laurate terpolymer with an ethylene content of 17% by weight, a vinyl chloride content of 70% by weight and a vinyl laurate content of 13% by weight, from Wacker-Chemie GmbH.

Dispersion LL 3:

Polyvinyl alcohol-stabilized aqueous dispersion with a solids content of 50% based on a styrene-acrylate copolymer with a styrene content of 50% by weight and a butyl acrylate content of 50% by weight, from Wacker-Chemie GmbH.

Dispersion LL 4:

Acrylamide-stabilized aqueous dispersion with a solids content of 50% based on a styrene-acrylate copolymer with a styrene content of 50% by weight and a butyl acrylate content of 50% by weight, from Wacker-Chemie GmbH.

Polyviol M 05/140:

Polyvinyl alcohol with a Höppler viscosity of 5 mPa.s, in 4% strength solution, and a saponification value of 140 (=degree of hydrolysis of 88 mol %), from Wacker-Chemie GmbH.

Polyviol M 13/140:

Polyvinyl alcohol with a Höppler viscosity of 13 mPa.s, in 4% solution, and a saponification value of 140 (=degree of hydrolysis of 88 mol %), from Wacker-Chemie GmbH.

PME:

Completely saponified copolymer of isopropenyl acetate and vinyl acetate (abbreviation PME) with a Höppler viscosity of 2.5 mPa.s, in 4% strength solution, and an isopropenyl acetate proportion of 20 mol %, from Wacker-Chemie GmbH.

B01/20

Polypropylene glycol with a molecular weight of 700, from Hoechst AG.

B01/40

Polypropylene glycol with a molecular weight of 1100, from Hoechst AG.

B01/80

Polypropylene glycol with a molecular weight of 1400, from Hoechst AG.

Hydresol PNP 50

A phenolsulfonate-formaldehyde condensate from BASF AG.

Agitan 305

Foaming inhibitor based on liquid hydrocarbons from Münzing Heilbronn.

EXAMPLE 1 (According to the Invention)

4000 parts by weight of Vinnapas-dispersion LL 1, 500 parts by weight of Polyviol M 05/140 as a 20% strength solution in water (5% based on LL 1 resin), 1000 parts by weight of Polyviol M 13/140 as a 10% strength solution in water (5% based on LL 1 resin), 10 parts by weight of Agitan 305 (0.5% based on LL 1 resin), 320 parts by weight of PME as a 25% strength solution in water (4% based on LL 1 resin), 60 g of polypropylene glycol B 01/10 (3% based on LL 1 resin) and 500 parts by weight of water were thoroughly mixed. The mixture was sprayed through a two-component nozzle. Air precompressed to 4 bar served as atomization component, the drops formed were dried with air heated to 125 degrees Celsius flowing co-currently. The dry powder obtained was treated with 10% by weight of commercial antiblocking agent (mixture of calcium-magnesium carbonate and magnesium hydrosilicate).

COMPARATIVE EXAMPLE A

The dispersion powder was produced according to Example 1, however no polypropylene glycol B 01/10 was used.

EXAMPLE 2 (According to the Invention)

The procedure as in Example 1 was followed, however instead of polypropylene glycol B 01/10, B 01/20 was used.

EXAMPLE 3 (According to the Invention)

The procedure as in Example 1 was followed, however instead of polypropylene glycol B 01/10, B 01/40 was used.

EXAMPLE 4 (According to the Invention)

The procedure as in Example 1 was followed, however instead of polypropylene glycol B 01/10, B 01/80 was used.

EXAMPLE 5 (According to the Invention)

4000 parts by weight of Vinnapas-dispersion LL 3, 500 parts by weight of Polyviol M 05/140 as a 20% strength solution in water (5% based on LL 3 resin), 1000 parts by weight of Polyviol M 13/140 as a 10% strength solution in water (5% based on LL 3 resin), 10 parts by weight of Agitan 305 (0.5% based on LL 3 resin), 20 g of polypropylene glycol B 01/80 (1% based on LL 3 resin) and 500 parts by weight of water were thoroughly mixed. The mixture was sprayed through a two-component nozzle. Air precompressed to 4 bar served as atomization component; the drops formed were dried with air heated to 125° C. flowing co-currently. The dry powder obtained was treated with 10% by weight of commercial antiblocking agent (mixture of calcium-magnesium carbonate and magnesium hydrosilicate).

EXAMPLE 6 (According to the Invention)

The procedure as in Example 5 was followed, however 60 g of polypropylene glycol B 01/80 were used (3% based on LL 3 resin).

EXAMPLE 7 (According to the Invention)

The procedure as in Example 5 was followed, however 100 g of polypropylene glycol B 01/80 were used (5% based on LL 3 resin).

COMPARATIVE EXAMPLE B

The dispersion powder was produced according to Example 5; however no polypropylene glycol B 01/80 was used.

EXAMPLE 8 (According to the Invention)

4000 parts by weight of Vinnapas-dispersion LL 2, 500 parts by weight of Polyviol M 05/140 as a 20% strength solution in water (5% based on LL 2 resin), 1000 parts by weight of Polyviol M 13/140 as a 10% strength solution in water (5% based on LL 2 resin), 10 parts by weight of Agitan 305 (0.5% based on LL 2 resin), 60 g of polypropylene glycol B 01/40 (1% based on LL 2 resin) and 500 parts by weight of water were thoroughly mixed. The mixture was sprayed through a two-component nozzle. Air precompressed to 4 bar served as atomization component; the drops formed were dried with air heated to 125° C. flowing co-currently. The drypowder obtained was treated with 10 parts by weight of commercial antiblocking agent (mixture of calcium-magnesium carbonate and magnesium hydrosilicate).

COMPARATIVE EXAMPLE C

A dispersion powder was prepared according to Example 8, however no polypropylene glycol B 01/40 was used.

EXAMPLE 9 (According to the Invention)

4000 parts by weight of Vinnapas-dispersion LL 4, 1000 parts by weight of Hydresol PNP 50 (phenolsulfonate-formaldehyde condensate from BASF AG) as a 20% strength solution in water (10% based on LL 4 resin), 60 g of polypropylene glycol B 01/40 (3% based on LL 4 resin) were thoroughly mixed. The mixture was sprayed through a two-component nozzle. Air precompressed to 4 bar served as atomization component; the drops formed were dried with air heated to 125° C. flowing co-currently. The dry powder obtained was treated with 10% by weight of commercial antiblocking agent (mixture of calcium-magnesium carbonate and magnesium hydrosilicate).

COMPARATIVE EXAMPLE D

The dispersion powder was prepared according to Example 9, however no polypropylene glycol B 01/40 was used.

Applications Investigations

Shrinkage Test

The shrinkage was tested according to DIN 52 450. To this end mortar prisms of 160×40×40 mm according to DIN 1164 were prepared from a mixture of 25 parts by weight of Portland cement 35F and 75 parts by weight of standard sand. In the production, 0.2% by weight of a pulverulent foaming inhibitor Agitan P 801 from Münzing, Heilbronn, was generally added. The mixture of cement, sand and pulverulent foaming inhibitor was mixed with the dispersion powders from the examples and comparative examples to form a dry mortar. The amount of the dispersion powder was given in parts by weight based on cement. (Plastic-cement factor KZ; KZ=0.1 means 10% by weight of dispersion powder based on the amount of cement used). The dry mortar was mixed with water, a water-cement factor WZ of 0.45 being maintained. The shrinkage was given in mm/m= per thousand. The formwork was stripped from the test specimen in each case one day after filling of the formwork. The formwork was covered during this time.

The results for the shrinkage of the test specimens produced using the dispersion powders according to the (comparative) examples are summarized in Table 1.

TABLE 1

| Dispersion powder | Plastic cement factor KZ | Shrinkage 28 days (mm/m) |
| --- | --- | --- |
| Series 1 | | |
| Example 1 | 0.1 | 0.86 ± 0.02 |
| Comp. Ex. A | 0.1 | 1.04 ± 0.03 |
| Exdmple 2 | 0.1 | 0.89 ± 0.02 |
| Example 3 | 0.1 | 0.89 ± 0.04 |
| Example 4 | 0.1 | 0.91 ± 0.02 |
| Series 2 | | |
| Example 5 | 0.1 | 0.81 ± 0.02 |
| Example 6 | 0.05 | 0.77 ± 0.01 |
| Example 6 | 0.1 | 0.74 ± 0.03 |
| Example 6 | 0.15 | 0.68 ± 0.02 |
| Example 7 | 0.1 | 0.71 ± 0.02 |
| Comp. Ex. B | 0.1 | 0.85 ± 0.02 |
| Series 3 | | |
| Example 8 | 0.1 | 0.75 ± 0.03 |
| Comp. Ex. C | 0.1 | 0.97 ± 0.02 |
| Example 9 | 0.1 | 0.92 ± 0.02 |
| Comp. Ex. D | 0.1 | 1.04 ± 0.03 |

We claim:

1. A redispersible dispersion powder composition for construction materials, said composition consisting essentially of
   a) a base polymer selected from the group consisting of vinyl ester homopolymers, vinyl ester copolymers of vinyl acetate, or vinyl ester copolymers of saturated $C_3$–$C_8$ alkyl-carboxylic acids with other vinyl ester, vinyl ester/ethylene copolymers; vinyl ester/ethylene/vinyl chloride copolymers; vinyl ester/vinyl chloride copolymers; vinyl ester/maleic acid ester copolymers; vinyl ester/fumaric acid ester copolymers, homopolymers of methacrylic acid esters, homopolymers of acrylic acid esters, homopolymers of styrene, copolymers of styrene and acrylic acid esters, copolymers of styrene and methacrylic acid esters and copolymers of vinyl chloride and ethylene,
   b) either
      b1) 2 to 20% by weight, based on the base polymer, of polyvinyl alcohol having a degree of hydrolysis of 85 to 94 mol % and a Hoppler viscosity of 2 to 40 mPa.s or
      b2) 2 to 20% by weight, based on the base polymer, of alkali metal salts or alkaline earth metal salts of phenolsulfonic acidformaldehyde condensation products, and
   c) 3 to 30% by weight, based on the total weight of polymeric components, of antiblocking agents, and
   d) 2 to 20% by weight, based on the base polymer of polypropylene glycol.

2. The composition of claim 1, wherein the polypropylene glycol d) is present in quantities of 2 to 8% by weight, based on the base polymer.

3. The composition of claim 1 or 2, wherein the polypropylene glycol d) has a molecular weight of 300 to 30,000 g/mol.

4. The composition of claim 1 or 2, wherein said base polymer is a vinyl acetate-ethylene copolymer which also contains vinyl ester monomers and/or vinyl chloride.

5. The composition of claim 1 or 2, wherein up to 30% by weight, based on the base polymer, of cement thinner is present.

6. The composition of claim 1 or 2, wherein up to 10% by weight, based on the base polymer, of completely saponified copolymers of 1-alkylvinyl esters and vinyl esters with a Hoppler viscosity of 1 to 25 mPa.s, determined in 4% strength solution, are present.

7. The composition of claim 1 or 2, wherein up to 2% by weight, based on the base polymer, of foaming inhibitors are present.

8. The composition of claim 1 or 2, wherein the redispersible dispersion powder composition is present in dry mortars which contain Portland cement as inorganic binder.

9. A dry mortar which contains Portland cement as an inorganic binder and the redispersible dispersion powder composition of claim 1 or 2.

10. The composition of claim 1, wherein said base polymer is a vinyl chloride-ethylene copolymer which also contains vinyl esters of saturated $C_3$–$C_8$ alkylcarboxylic acids.

11. The composition of claim 1 wherein said base polymer is a styrene-acrylate copolymer.

* * * * *